United States Patent [19]

Nishino et al.

[11] Patent Number: 4,965,790
[45] Date of Patent: Oct. 23, 1990

[54] COMMUNICATION SYSTEM FOR FORMING DIFFERENT NETWORKS ON THE SAME RING TRANSMISSION LINE

[75] Inventors: Tetsuo Nishino; Osamu Isono; Tetsuo Tachibana, all of Kawasaki; Eisuke Iwabuchi, Yokohama; Toshimasa Fukui, Kawasaki, all of Japan

[73] Assignee: Fujitsu Limited, Kawasaki, Japan

[21] Appl. No.: 320,574

[22] Filed: Mar. 8, 1989

[30] Foreign Application Priority Data

Mar. 9, 1988 [JP] Japan .................................. 63-055506

[51] Int. Cl.$^5$ ............................................... H04J 3/17
[52] U.S. Cl. .................................. 370/85.12; 370/85.7
[58] Field of Search ........................ 370/89, 86, 88, 95, 370/110.1, 85.1, 85.7, 85.9, 85.12, 85.15, 95.1

[56] References Cited

U.S. PATENT DOCUMENTS

| 4,602,365 | 7/1986 | White et al. | 370/88 |
| 4,685,101 | 8/1987 | Segal et al. | 370/89 |
| 4,722,082 | 1/1988 | Furuya et al. | 370/110.1 |
| 4,747,101 | 5/1988 | Akaiwa et al. | 370/89 |
| 4,771,425 | 9/1988 | Baren et al. | 370/110.1 |
| 4,847,833 | 7/1989 | Doering et al. | 370/86 |

Primary Examiner—Douglas W. Olms
Assistant Examiner—Min Jung
Attorney, Agent, or Firm—Staas & Halsey

[57] ABSTRACT

Disclosed is a ring transmission system which incorporates both a narrowband network and a broadband ISDN network. The system comprises a plurality of nodes connected to a ring line. Each node comprises a drop/insert unit for dropping/inserting data by the use of a communication channel allocated to the node and an allocation changing circuit, whereby, a plurality of independent narrowband and broadband exchange networks are connected to a single ring transmission line.

21 Claims, 19 Drawing Sheets

MESSAGE TRANSMITTED BY ZI OH

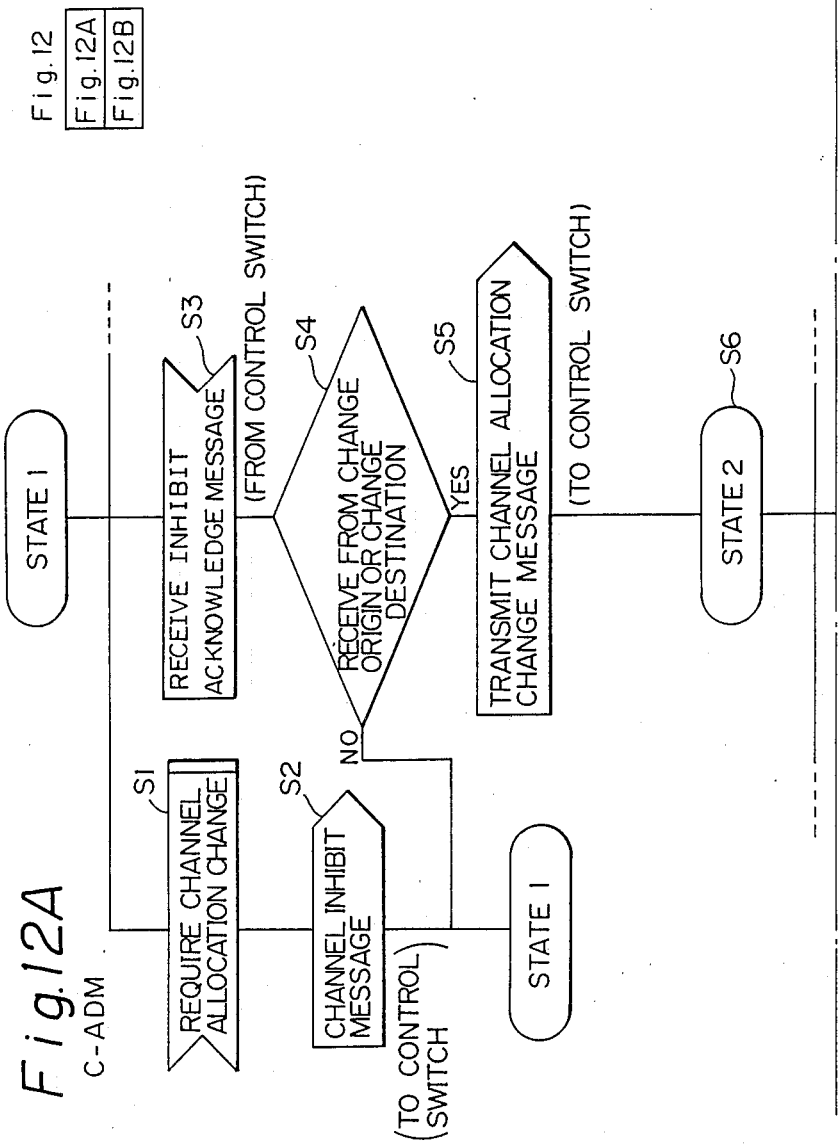

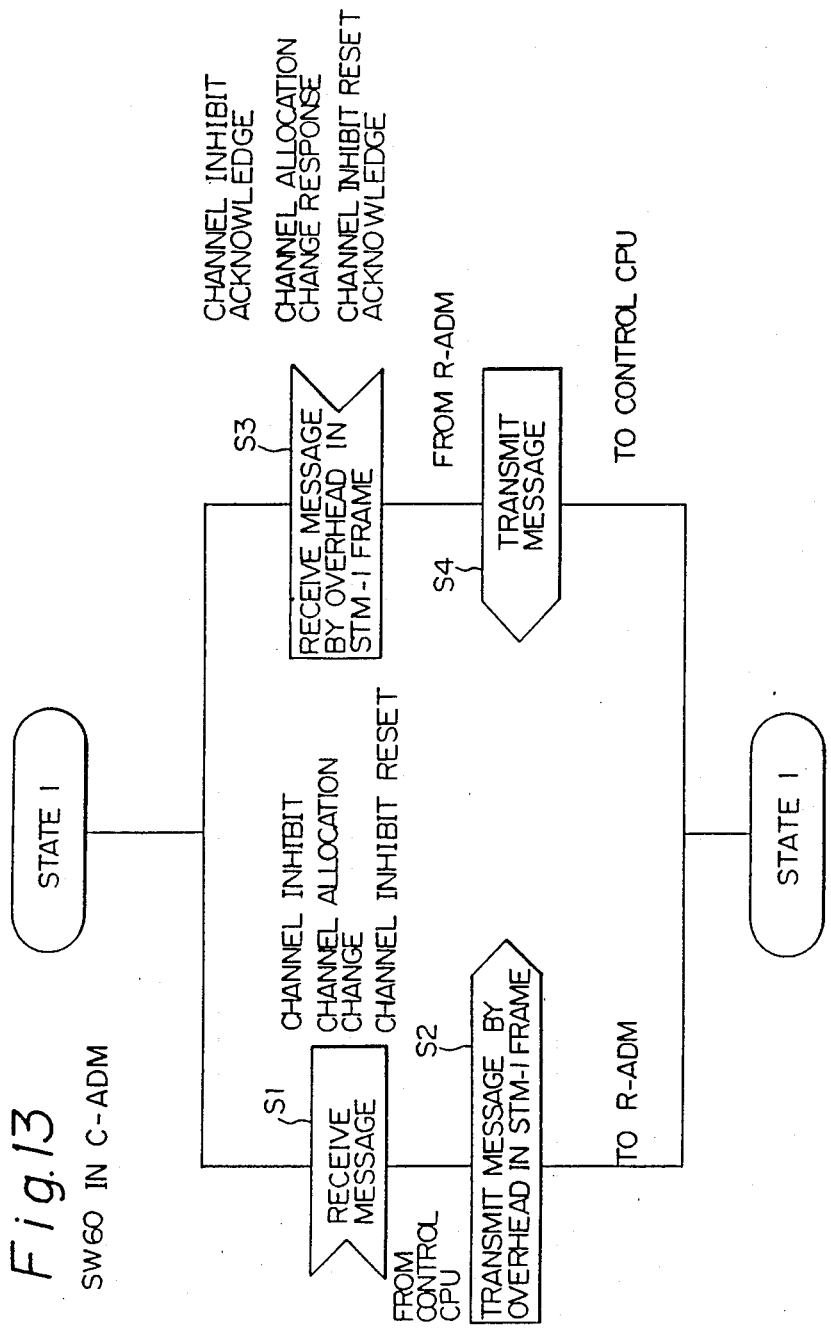

SW60 IN R-ADM

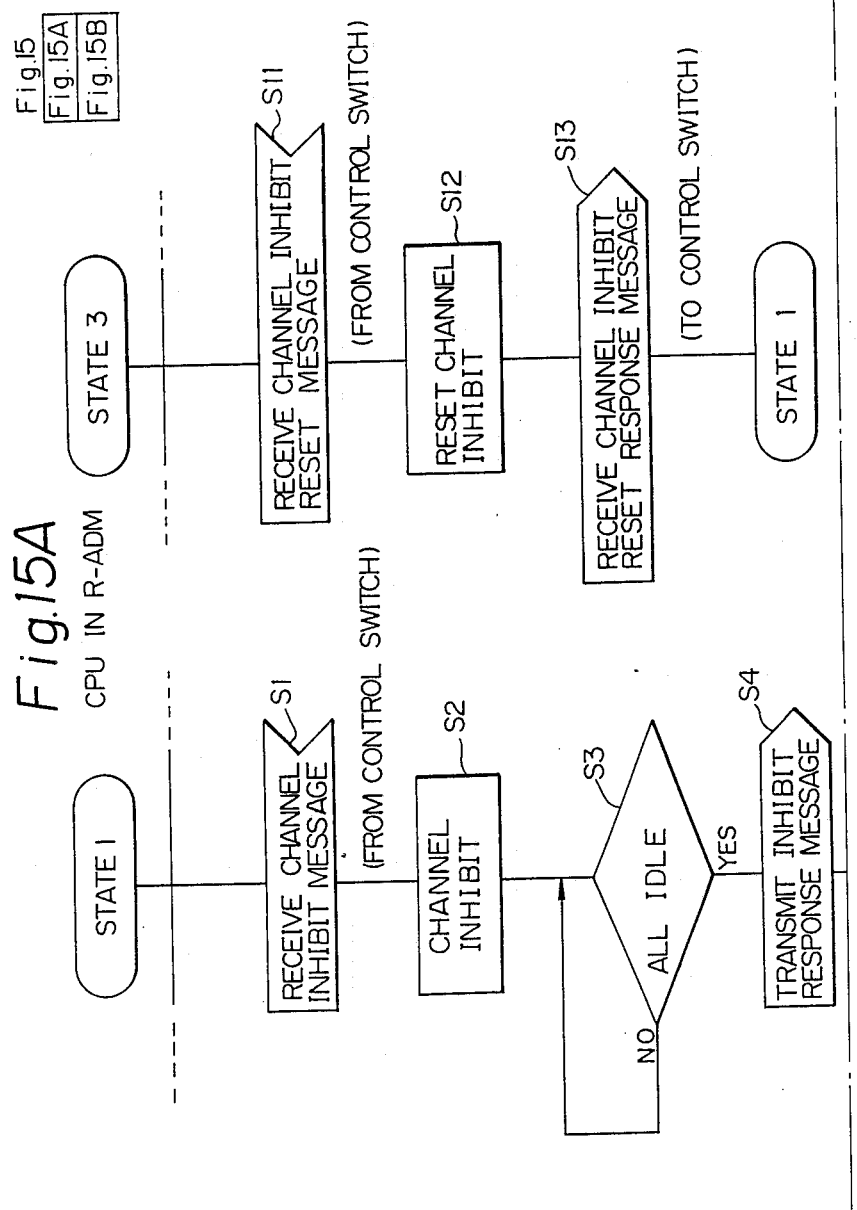

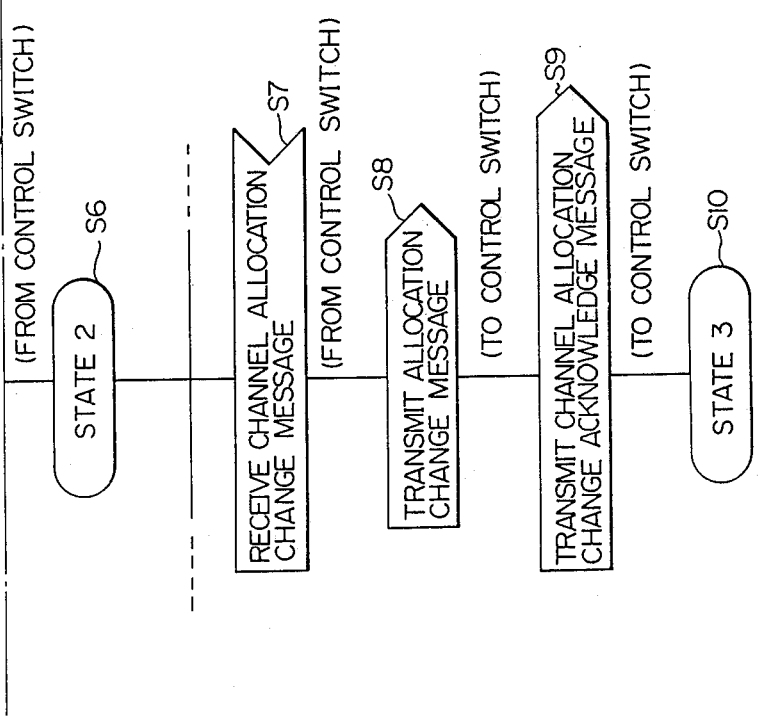

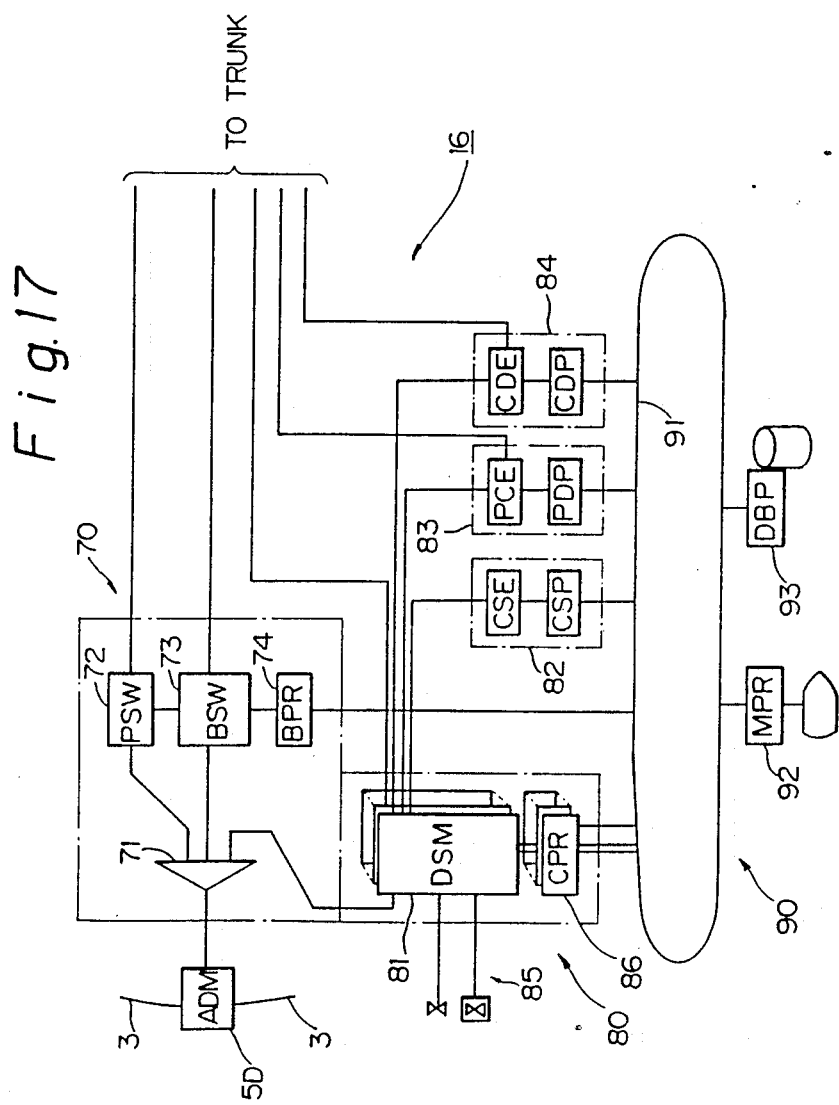

COMMUNICATION SYSTEM FOR FORMING DIFFERENT NETWORKS ON THE SAME RING TRANSMISSION LINE

BACKGROUND OF THE INVENTION

1. Field of the Invention

The present invention relates to a ring transmission system of a communication network, and more particularly relates to network configurations for flexibly incorporating and integrating conventional communication networks into a broadband ISDN network (Integrated Services Digital Network).

Recent public telephone networks and narrowband ISDN networks have tended to be changed to a new broadband ISDN network which involves these conventional networks and can provide various communication services. In the transfer to the new broadband ISDN network, a problem arises in how to harmonize, integrate, and develop the conventional communication networks into the new broadband ISDN network without suddenly changing the conventional communication networks to the new ISDN network.

2. Description of the Related Art

As prior art of the present invention, there are the following documents:

① Japanese Examined Patent Publication No. 54-29052, published on Sept. 20, 1979;

② Japanese Unexamined Patent Publication No. 58-210743, published on Dec. 8, 1983;

③ Japanese Unexamined Patent Publication No. 60-65643, published on Apr. 15, 1985; and ④ "A Strategy of Evolution for the Broadband ISDN", by Takao Takeuchi et al, GLOBECOM '87, IEEE pp1881-1886.

The above reference ① discloses a time-division data exchange system accommodating a plurality of terminal equipment having different communication speeds. This reference does not directly relate to the present invention, but the relation between an exchange and remote equipment which relation itself is a prior art of the present invention is disclosed.

The above reference ② discloses a conventional concept of a loop network in which a plurality of local networks are connected to a large loop network.

The above reference ③ discloses exchange networks having different communication speeds by utilizing loop transmission lines.

A conventional public telephone network or a narrowband ISDN network is constructed as a star network configuration in accordance with optimum network operation and to meet various service requirements, as disclosed in the above-reference ①. The construction of these conventional networks provide various functions, but is not able to provide a convenient service including broadband communications required by current media, such as video, image, data, sound etc.

In narrowband communications, a channel of 64 Kbps, 384 Kbps, 1.5 Mbps, etc., is used for transmission. In broadband communications, a channel of 30 to 35 Mbps, 60 to 70 Mbps, 132 to 138 Mbps is used.

A communication configuration in a single broadband ISDN network has been developed in which the various services described above can be provided, but such a broadband ISDN network is usually independent of an existing communication network consisting of a public telephone network and a narrowband ISDN network, and a workable connection between these networks cannot be established. Namely, the various communication networks are not integrated as a desired communication configuration, and therefore, a useful communication network is not achieved.

Accordingly, further research into the techniques of incorporating and integrating the existing communication network into the broadband ISDN network, which is considered to be a flexible communication configuration, to develop to a unitary communication configuration, has not been carried out.

SUMMARY OF THE INVENTION

The present invention was created in view of the above techniques, and an object thereof is to provide a ring transmission system which will efficiently achieve a gradual incorporation and integration of an existing communication network with an ISDN network.

To attain the above object, there is provided, according to the present invention, a ring transmission system including: a ring transmission line for transmitting data through a plurality of communication channels; and a plurality of nodes connected to the ring transmission line. The communication channels are allocated for use to the nodes. Each of the nodes comprises a drop/insert means for dropping data from the ring transmission line or for inserting data into the ring transmission line, by utilizing one of the communication channels allocated to its own node; and an allocation changing means for changing the allocation of the communication channel. Between nodes to which the same communication channel is allocated, an independent exchange network is constructed so that a plurality of independent exchange networks are constructed by the plurality of nodes and the ring transmission line. The construction of the independent exchanging networks is variable by changing the allocation of the communication channels through control signaling between nodes.

According to an aspect of the present invention, the plurality of independent exchange networks are those respectively for performing broadband network communications and narrowband network communications independently.

According to another aspect of the present invention, each of the communication channels has the same capacity as the others to transfer data through the ring transmission line so that the transmission speed of each of the communication channels is the same and fixed to each other, and each of the communication channels is comprised of a plurality of subblocks.

According to still another aspect of the invention, the transmission speed of each of the communication channels is determined to be the maximum communication speed in the plurality of independent exchanging networks.

According to still another aspect of the present invention, the transmission speed of each of the communication channels is determined to be the transmission speed of the broadband network communications, and each of the narrowband network communications is carried out by utilizing a part of the subblocks included in each of the communication channels.

According to still another aspect of the present invention, when the channel allocation is to be changed in any of the nodes by the allocation changing means, the communication channel which has been allocated to the node is inhibited for use and then, after changing the allocation of the communication channel of the node, the channel is opened for use.

According to still another aspect of the present invention, each of the nodes comprises a table for registering channel information indicating the communication channels available for the node. The communication is effected by the use of the communication channels, the channel information of which is registered in the table.

According to still another aspect of the present invention, one or more of the nodes are connected to synchronous transfer mode (STM) units in each of which an allocated number of variable length slots included in the allocated communication channel are used to communicate, and the other nodes are connected to asynchronous transfer mode (ATM) units in each of which an allocated number of fixed or variable length cells included in the allocated communication channel are used to communicate.

According to still another aspect of the present invention, each of the nodes has control means for controlling the connection between the ring transmission line and a terminal device. The control means comprises the drop/insert means for dropping or inserting a communication channel from or into the ring transmission line, by multiplexing data from respective terminal device and inserting it into an allocated one of the communication channels on the ring transmission line, or by dropping, from the allocated communication channel on the ring transmission line, multiplexed data transmitted from another node through the ring transmission line. whereby a communication between the nodes in an exchange network utilizing the allocated communication channel is effected.

According to still another aspect of the present invention, one of the nodes is a control node having means to allocate the communication channels to the nodes.

According to still another aspect of the present invention, the control node has means for determining the allocation of the plurality of communication channels to the respective nodes, and; when a communication channel is to be allocated to a predetermined nodes in the nodes, an inhibit command to inhibit the use of the communication channel is transmitted from the control node to at least the nodes to which said communication channel is already allocated after receiving an acknowledge signal from the predetermined nodes, a channel allocation changing command is transmitted from the control node to the nodes; and after receiving an acknowledge signal from the nodes in response to the channel allocation changing command, an open command to allow the use of the communication channel is transmitted to the predetermined nodes.

According to still another aspect of the present invention, when a predetermined channel is to be allocated to a plurality of the nodes, the control node transmits the channel allocation changing command to all of the plurality of nodes after receiving acknowledge signals from all of the plurality of nodes in response to the inhibit command.

According to still another aspect of the present invention, the control node has means for storing channel information indicating the communication channels being used in a respective node, and each of the respective nodes has means for storing channel information indicating communication channel available to its own node, whereby a communication channel transmitting through the ring transmission line and allocated to the nodes other than its own node is bypassed by its own node.

According to still another aspect of the present invention, the ring transmission line is a synchronous high-speed transmission line and the respective nodes connected to the transmission line are one control node and a plurality of remote nodes. The control node supervises and controls the operating state of the ring transmission line such as the state of use of the communication channels, and, if necessary, commanding a change of the channel allocation being used in said respective remote nodes. The respective remote nodes have means to change the channel allocation in accordance with the command from the control node, and have means to return a change acknowledge message to the control node.

According to still another aspect of the present invention, the communication channel comprises an overhead part and a payload for transferring user data. A channel allocation change command/change acknowledge message is formed by predetermined bytes and is transferred by the use of the overhead part.

According to still another aspect of the present invention, the plurality of independent exchange networks constitute a logical star network by physically utilizing the ring transmission line.

By the above construction of the ring transmission line according to the present invention, a ring transmission line capable of transmitting narrowband calls and broadband calls is formed between nodes both of which are capable of dealing with at least one of either a narrowband call or a broadband call.

Namely, by transmitting and receiving data between nodes through a communication channel formed on the ring transmission line, the ring transmission system which enables the transmission control for both calls can be established to transmit or receive the narrowband call or the broadband call between these nodes.

The established ring transmission system enables the handling of at least one of the calls between both of the drop/insert units. Therefore, when the drop/insert units for transmission and receiving is capable of processing data of both calls, the data of said calls, which is input to the transmitting drop/insert unit and subject to the inserting and, if necessary, multiplexing process, and transmitted through the ring transmission line to the receiving drop/insert unit, is dropped and separated in the receiving drop/insert unit into data of the respective calls and the respective separated outputs are transmitted to the transmission destinations.

Accordingly, the ring transmission system of the present invention is physically constructed as a ring and logically has a star configuration, in which the ring transmission line is commonly used for various communication networks. Thus this communication system is an extremely advantageous means of gradually incorporating and integrating various communication networks with a broadband ISDN network.

BRIEF DESCRIPTION OF THE DRAWINGS

FIGS. 12(A) and 12(B) are diagrams showing a processing flow in a control switch in a C-ADM for channel allocation change, according to the first embodiment of the present invention;

FIG. 13 is a diagram showing a processing flow in a control switch in a C-ADM for channel allocation change, according to the first embodiment of the present invention;

FIGS. 15(A) and 15(B) are diagrams showing a processing flow in a control CPU in a R-ADM for channel switching, according to the first embodiment of the present invention;

FIG. 17 is a diagram showing an example of the construction of a narrowband/broadband exchange.

DESCRIPTION OF THE PREFERRED EMBODIMENTS

For better understanding of the present invention, a conventional communication network will first be described with reference to FIGS. 1, 2A and 2B.

Figure 1:
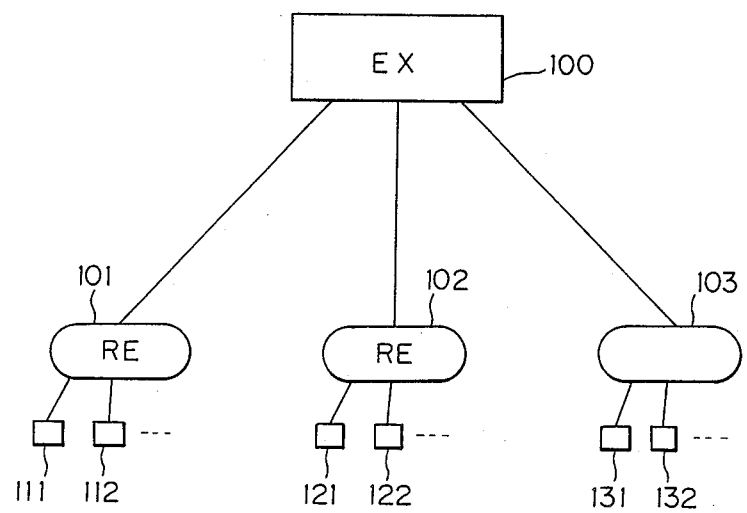
FIG. 1 is a diagram showing an example of a conventional network construction.

FIG. 1 shows an example of a conventional communication network. In FIG. 1, the conventional network has a star configuration including a central exchange office 100 and a plurality of remote devices 101, 102, and 103. Each of the remote devices is connected to a plurality of subscribers or other terminal devices 111, 112, ..., 121, 122, ..., 131, 132, ... Such a conventional network is an example of an existing analog network or a narrowband ISDN network.

Figure 2A:
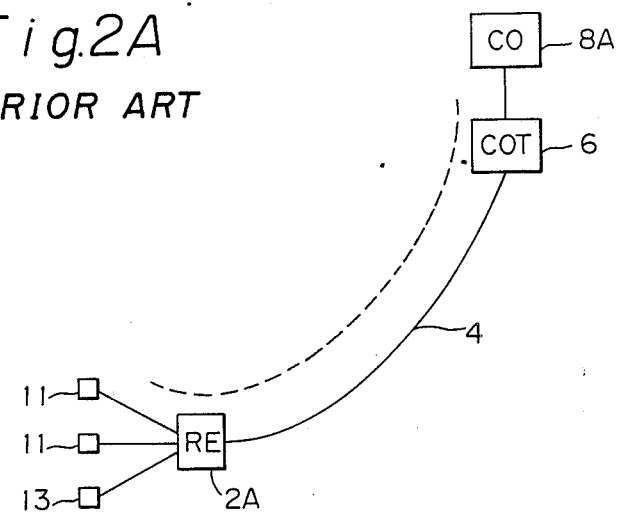
FIG. 2A is a diagram showing an example of a conventional subscriber line multiplex transmitting system.

FIG. 2A shows an example of the conventional analog network. In FIG. 2A, analog terminals 11 and a special service terminal 13 are connected through a remote device (RE) 2A, an optical fiber cable 4 of, for example, 1.5 to 810 Mbps, and central office terminal (COT) 6, to a central office (CO) 8A. The central office 8A includes a narrowband exchange (not shown).

Figure 2B:
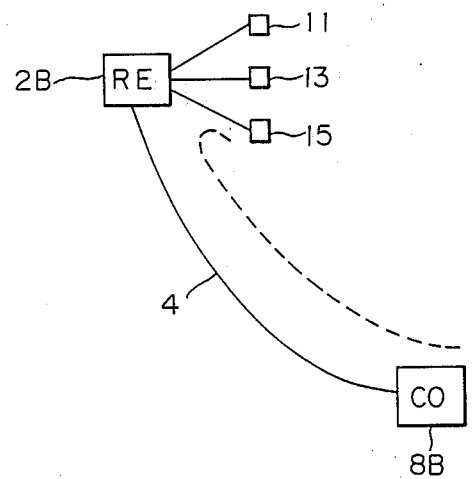
FIG. 2B is a diagram showing another example of a conventional subscriber line multiplex transmitting system.

FIG. 2B shows an example of the conventional narrowband network including a narrowband ISDN network. In FIG. 2B, the analog terminal 11, the special service terminal 13, and an ISDN terminal 15 are connected through a narrowband remote device 2B and the optical fiber cable 4 o a narrowband exchange 8B.

The narrowband exchange 8A and 8B are usually connected through a toll switch (not shown) to form a narrowband network including the narrowband analog network and the narrowband ISDN network. A broadband ISDN network, however, cannot conventionally be combined with the narrowband network because the channel capacity on the optical transmission line is different between the narrowband network and the broadband network.

Therefore, in the conventional art, the broadband ISDN network must constructed independently from the narrowband network resulting in communication between the narrowband network and the broadband ISDN network being impossible.

In view of the above problem in the conventional art, the present invention provides a new broadband ISDN network which can accommodate not only the broadband ISDN terminals but also the narrowband ISDN or other terminals.

Figure 3:
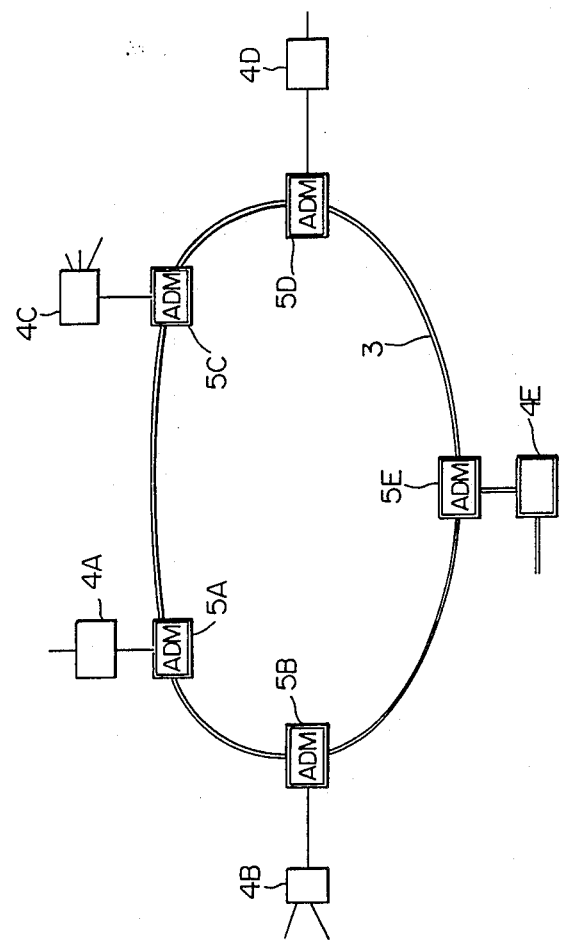
FIG. 3 is a diagram showing a principal diagram of a ring transmission system according to an embodiment of the present invention.

FIG. 3 is a diagram explaining the principle of a ring transmission system according to an embodiment of the present invention. In FIG. 3, the ring transmission system includes a ring (or loop) optical transmission line (hereinafter referred to as a ring transmission line) 3 which is capable of transmitting both a narrowband call and a broadband call between nodes including drop/insert multiplexing units (add/drop multiplexing units ADM) 5A, 5B, 5C, 5D, and 5E for connecting units 4A, 4B, ... for both calls. A plurality of communication channels pass through the ring transmission line 3. Each communication channel is allocated for use to the nodes. Each of the drop/insert units 5A, 5B, 5C, 5D, and 5E drops data from the ring transmission line or inserts data into the ring transmission line, by utilizing one of the communication channels allocated to its own node. The allocation can be changed or switched as described later in more detail. An independent exchanging network is constructed by the nodes to which the same communication channel is allocated and the ring transmitting line 3. Since there are a plurality of communication channels, a plurality of independent exchanging networks corresponding to the respective communication channels are constructed by the plurality of nodes and the ring transmission line 3. The construction of the independent exchanging networks is variable by changing the allocation of the communication channels by the communication between nodes.

Thus, a communication control system is established which enables a transmission and receipt of both a narrowband call and a broadband call between two of the drop/insert multiplexing units as transmission terminals on the ring transmission line 3, whereby an integration of the respective communication systems connected to the drop/insert multiplexing units is developed.

Figure 4:
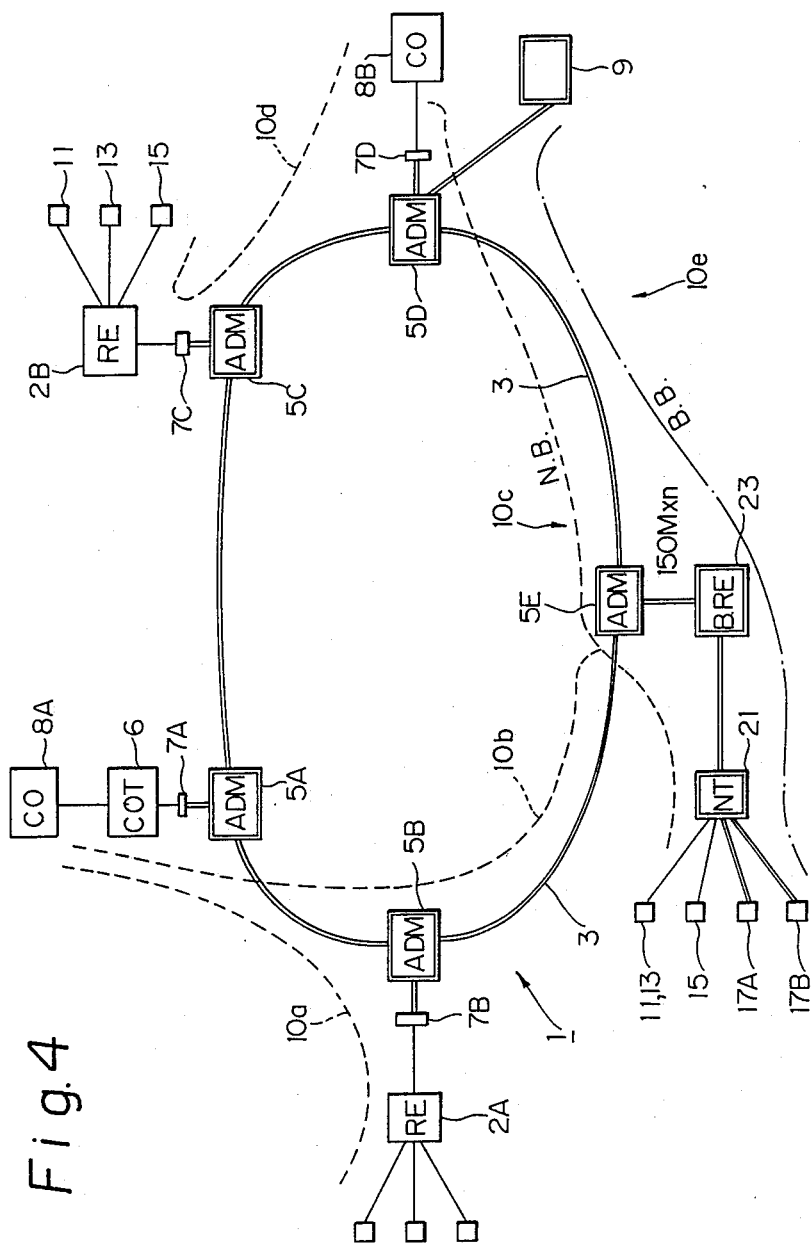
FIG. 4 is a diagram showing the ring transmission system according to a first embodiment of the present invention.

FIG. 4 shows a practical example of the ring transmission system shown in FIG. 3 according to a first embodiment of the present invention. In FIG. 4, the same reference symbols as those used in FIGS. 2A, 2B, and 3 represent the same parts. The ring transmission system 1 consists of a ring transmission line 3 formed by a high-speed optical fiber cable forming a closed loop, and a plurality of nodes 5A, 5B, 5C, 5D, and 5E each including an add/drop/multiplex unit (ADM), or in other words, a drop/insert/multiplex unit (hereinafter the node is referred to as ADM). The ADMs are located on the ring transmission line 3 as required.

The ADM 5A in the ring transmission system 1 is connected through as interface unit 7A and the central office terminator (COT) 6 to the narrowband exchange (CO) 8A. The ADM 5B is connected through an interface unit 7B and the narrowband remote device 2A to the analog telephone terminal device 11 and a special service terminal 13. The ADM 5A and the ADM 5B are connected through a part of the ring transmission line 3. Thus, a narrowband network 10a is formed as illustrated by a dash line between these terminal devices 11 and 13, and the narrowband exchange 8A, through a part of the ring transmission line 3. The narrowband network 10a itself is substantially the same as the conventional network shown in FIG. 2B Similarly, a narrowband network 10b is formed between the narrowband exchange 8A and the terminals 11, 13, or 15 connected through a network terminator (NT) 21 and a broadband remote device (B.RE) 23, to the ADM 5E. Also, a narrowband network 10c is formed between the narrowband exchange 8B and the terminals 11,13, or 15 connected through the network terminator (NT) 21 and the broadband remote equipment (B.RE) 23, to the ADM 5E. Further, a narrowband network 10d is formed between the narrowband exchange 8B and the terminals 11, 13, or 15 connected through the narrowband remote equipment 2B and as interface unit 7C, to the ADM 5C. The above-mentioned narrowband networks 10b, 10c, and 10d themselves are substantially the same as the conventional network shown in FIG. 2B.

In addition to the above-mentioned narrowband networks, a broadband network 10e is formed as illustrated by a dash-dot line between a broadband exchange 9 and broadband ISDN terminal devices 17A and 17B.

The interface unit 7A, the central office terminator 6, and the narrowband exchange 8A; the interface unit 7B and the narrowband remote device 2A; the interface unit 7c and the narrowband remote device 2B; and the interface unit 7D, the narrowband exchange 8B, the broadband exchange 9, and the broadband remote device 23, respectively correspond to the units 4A, 4B, 4C, 4D, and 4E in FIG. 3 for the narrowband calls and or the broadband calls.

Accordingly, in the ring transmission system 1 shown in FIG. 4, both the narrowband communication and the broadband communication are possible by a single integrated network system. Therefore, a new broadband ISDN network can be developed while the existing narrowband devices are still maintained.

To this end, the ring transmission line 3 is capable of transmitting data at a maximum speed of the broadband ISDN data. The data on the ring transmission line 3 is transmitted by a plurality of communication channels. One of the communication channels is allocated to each node. Each block data of the narrowband or broadband communication is included in the necessary number of subblocks in the allocated communication channel. Each ADM has a function of inserting data channel by channel into the ring transmission line 3 using a multiplexing method and has a function of dropping data from the ring transmission line 3 channel by channel.

Figure 5:
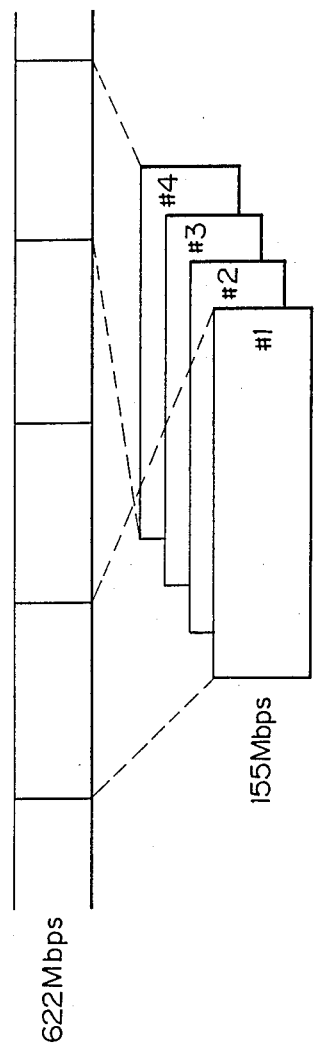
FIG. 5 is a diagram showing a logical structure of channels in the first embodiment of the present invention.

FIG. 5 is a diagram showing a logical channel format for data transmitted through the ring transmission line 3. In FIG. 5, four channels #1 to #4 each having a transmission speed of, for example, 155 Mbps are multiplexed to form a high speed data transmission of 622 Mbps. A plurality of channels are arranged on the transmission line 3. As an example, the channels may be those of level 1 synchronous transfer mode (STM-1). In place of the STM-1 channels, asynchronous transfer mode (ATM) channels may also be employed. In each STM-1 channel, a plurality of slots are included. In each ATM channel, a plurality of fixed of variable length cells are included. These slots and length cells are referred to herein as subblocks.

Figure 6:
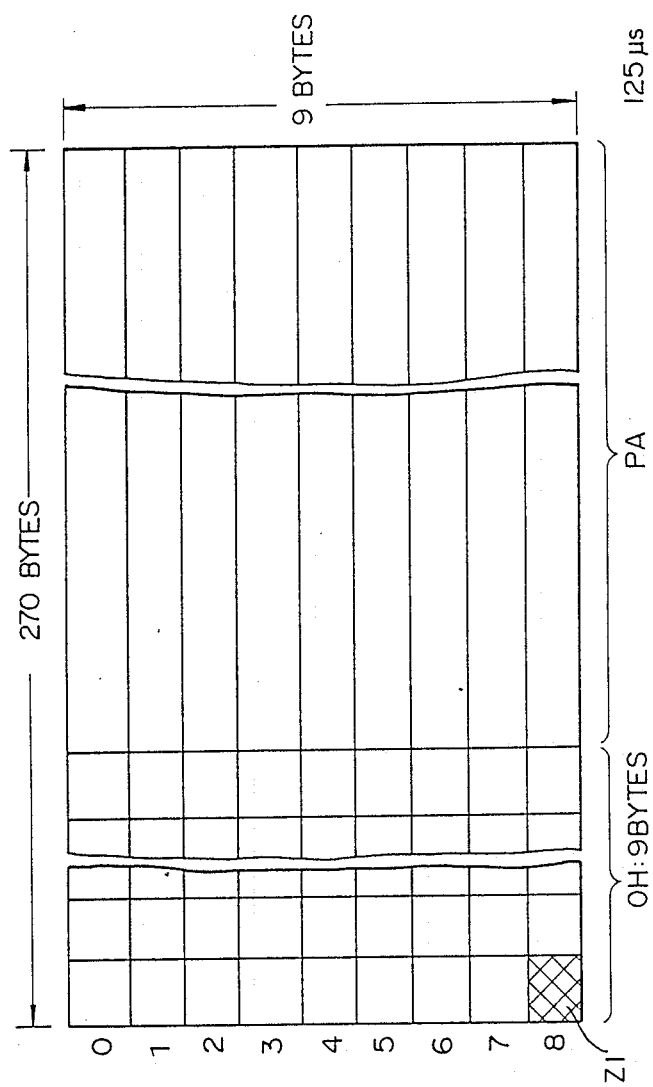
FIG. 6 is a diagram showing the construction of a channel in the first embodiment of the present invention.
Figure 7:
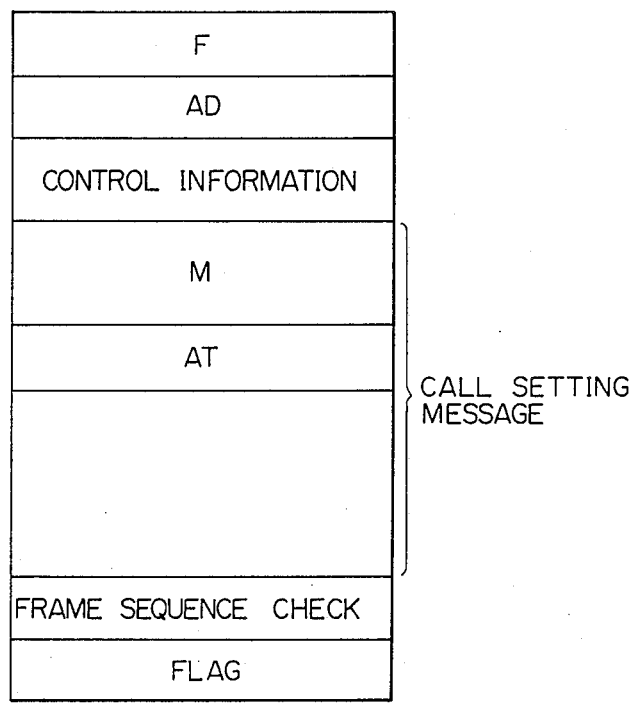
FIG. 7 is a diagram showing an example of the messages transmitted in overhead in the channel shown in FIG. 6.

FIG. 6 is a diagram showing an example of the construction of one STM-1 channel. In FIG. 6, the STM-1 channel consists of nine rows each including nine bytes of an overhead OH and 261 bytes of a payload PA for user data transmission. An area Z1 in the overhead OH is used to transmit messages such as a channel inhibit message which is used when the allocation to a node is to be changed. These messages include, as shown in FIG. 7, further control signals such as a flag F indicating the head position of the message, an address AD of the destination, message information M including the above-mentioned channel inhibit message, a service attribute AT indicating, for example, a narrowband call or a broadband call, a frame check sequence, and a flag indicating the end of the channel.

Figure 8:
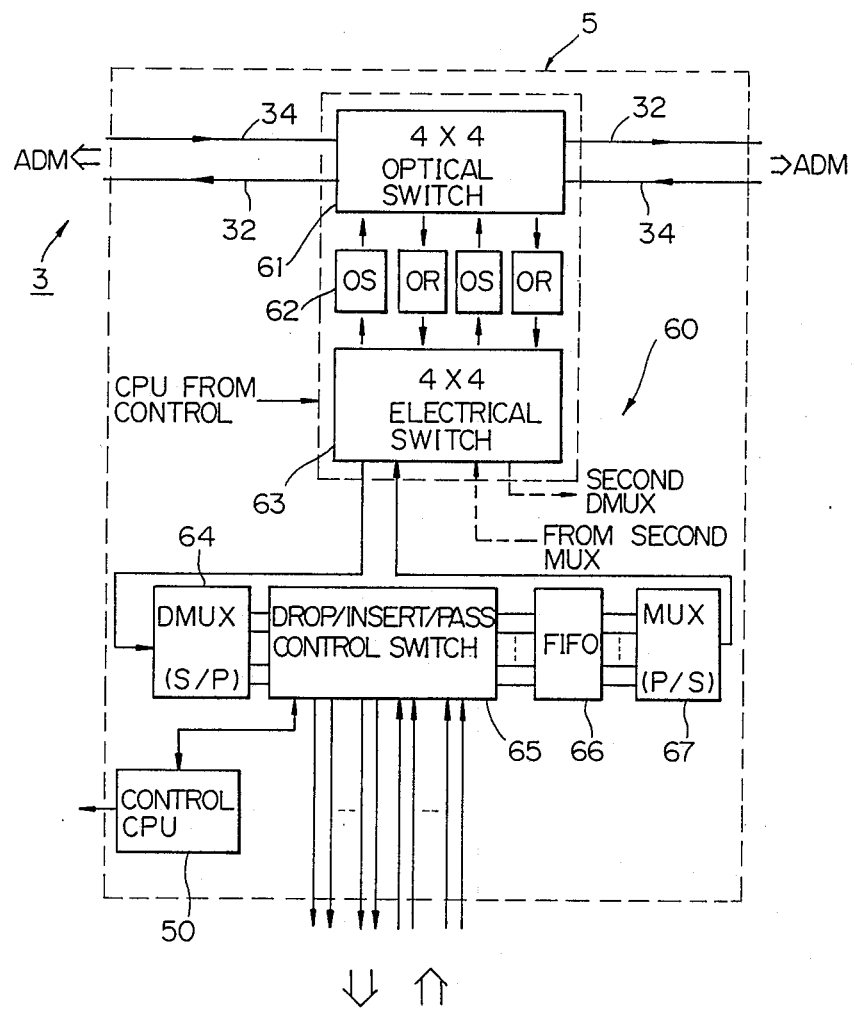
FIG. 8 is a diagram showing a drop/insert unit, according to the first embodiment of the present invention.

FIG. 8 is a block diagram showing the construction of one of the ADMs. In FIG. 8, the ADM mainly consists of a control switch 60 and a control CPU 50. The control switch 60 is provided between an input optical fiber cable 34 and an output optical fiber cable 32 both comprising the ring transmitting line 3. The control switch 60 includes an optical switch 61, an opticelectric converting unit 62, an electrical switch 63, a demultiplexer 64 for converting serial data to parallel data, drop/insert/pass control switch 65, a first-in-first-out memory (FIFO) 66 and a multiplexer 67 for converting parallel signals into a serial signal.

The optical switch 61 and the electrical switch 63 in the control switch 60 control the switching of the communication channel allocated to the ADM under the control of the control CPU 50. The drop/insert/pass control switch 65 controls the drop, insert, or pass the communication channel input from the electrical switch 63 through the demultiplexer 64 under the control of the control CPU 50. The ADM is well known in the field of the broadband transmission, and FIG. 8 shows a practical construction thereof. The ADM is so constructed as to be able to drop/insert multiplexing process for the previously allocated channel in the plurality of communication channels arranged on and passed through the ring transmission line 3. Various types of initial allocation of the channel are used, depending on the phases of the communication system, and one thereof uses the later described switching sequence.

When the control CPU 50 discriminates, from the input signal, the communication channel allocated on the ADM, the channel including control data (for example the later described various messages) and/or user data is dropped and separated (demultiplexed) and sent to respective devices connected to the ADM, and the data from these devices are inserted and multiplexed into the above-mentioned allocated communication channel. The control CPU 50 receives the control data from the drop/insert/multiplex control switch 65 and controls the above-mentioned dropping or insertion and multiplexing by a program (stored in a not-shown memory) in response to the control data.

Figure 9:
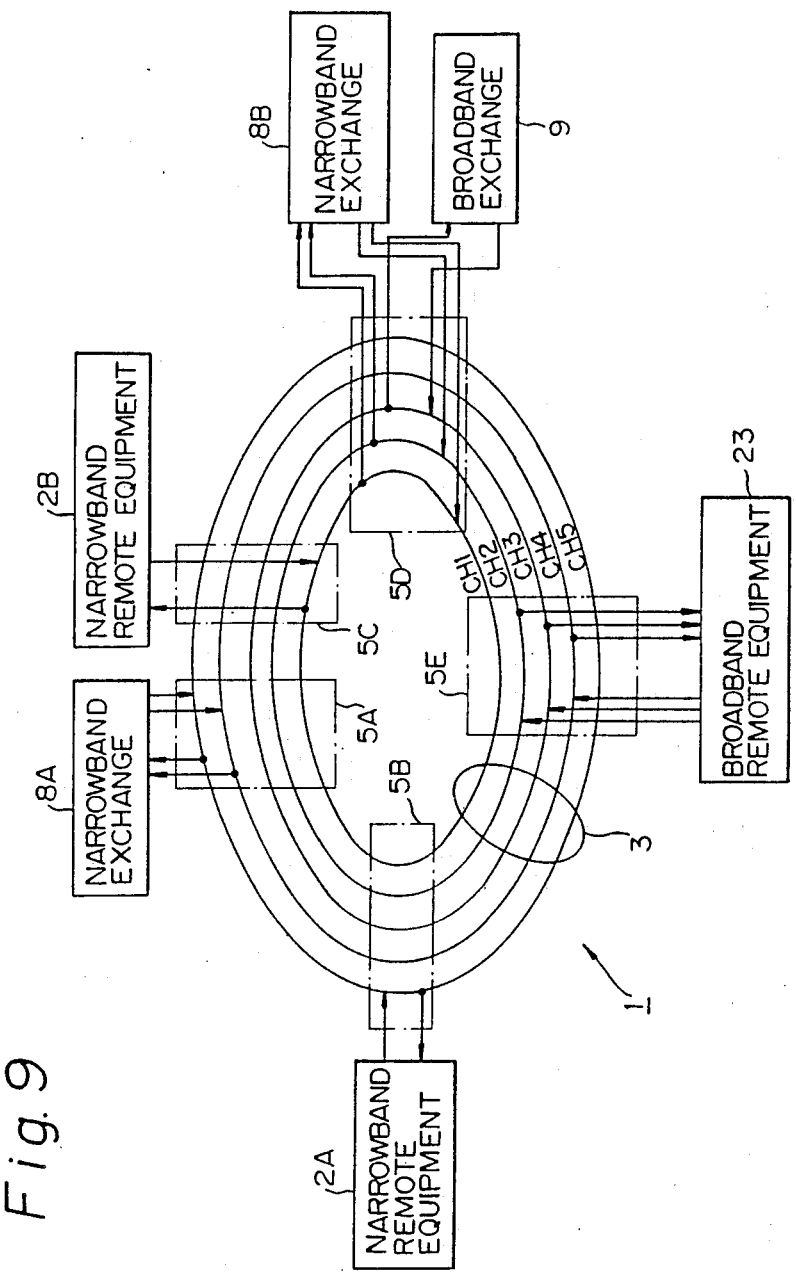
FIG. 9 is a diagram showing an example of channel allocations in the ring transmission system in FIG. 4.

FIG. 9 is a diagram showing an example of the channel allocations in the ring transmission system shown in FIG. 4. In FIG. 9, the ring transmission line 3 is illustrated by five lines respectively corresponding to the communication channels CH1 to CH5 in order to ensure an easy understanding of the channel allocations. In practice, however, the ring transmission line 3 is a single multiplexing optical fiber cable. Of course, the line 3 may be constructed by a bundle comprising a plurality of lines as illustrated. When the channel allocation process is finished, each ADM is set to the initial state, for example from a predetermined channel allocated state to the channel allocated state as shown in FIG. 9, so that a plurality of independent networks including the narrowband networks and the broadband ISDN networks are established between the respective ADMs on the ring transmission line 3. In the example of the channel allocation shown in FIG. 9, the channel CH4 and CH5 are allocated to the ADMs 5A as the channels available for communication between the ring transmission line 3 and the narrowband exchange 8A; the channel CH5 is allocated to the ADM 5B as the channel available for communication between the ring transmission line 3 and the narrowband exchange 2A; the channel CH1 is allocated to the ADM 5C as the channel available for communication between the ADM 5C and the narrowband remote device 2B; the channels CH1 and CH2 are allocated to the ADM 5D as the channels available for communication between the ADM 5D and the narrowband exchange 8B; the channel CH3 is allocated to the ADM 5D as the channel available for communication between the ADM 5D and the broadband exchange 9; and the channels CH2, CH3 and CH4 are allocated to the ADM 5E as the channels available for communication between the ADM 5E and the broadband remote device 23.

As shown by, these examples of channel allocations, communications become possible for a narrowband call between the narrowband exchange 8A and the remote device 2A, between the narrowband exchange 8A and the broadband remote device 23, between the narrowband remote device 2B and the narrowband exchange 8B, and between the broadband remote device 23 and the narrowband remote device 2B, and, in addition, for a broadband call between the broadband exchange 9 and the broadband remote equipment 23.

Figure 10:
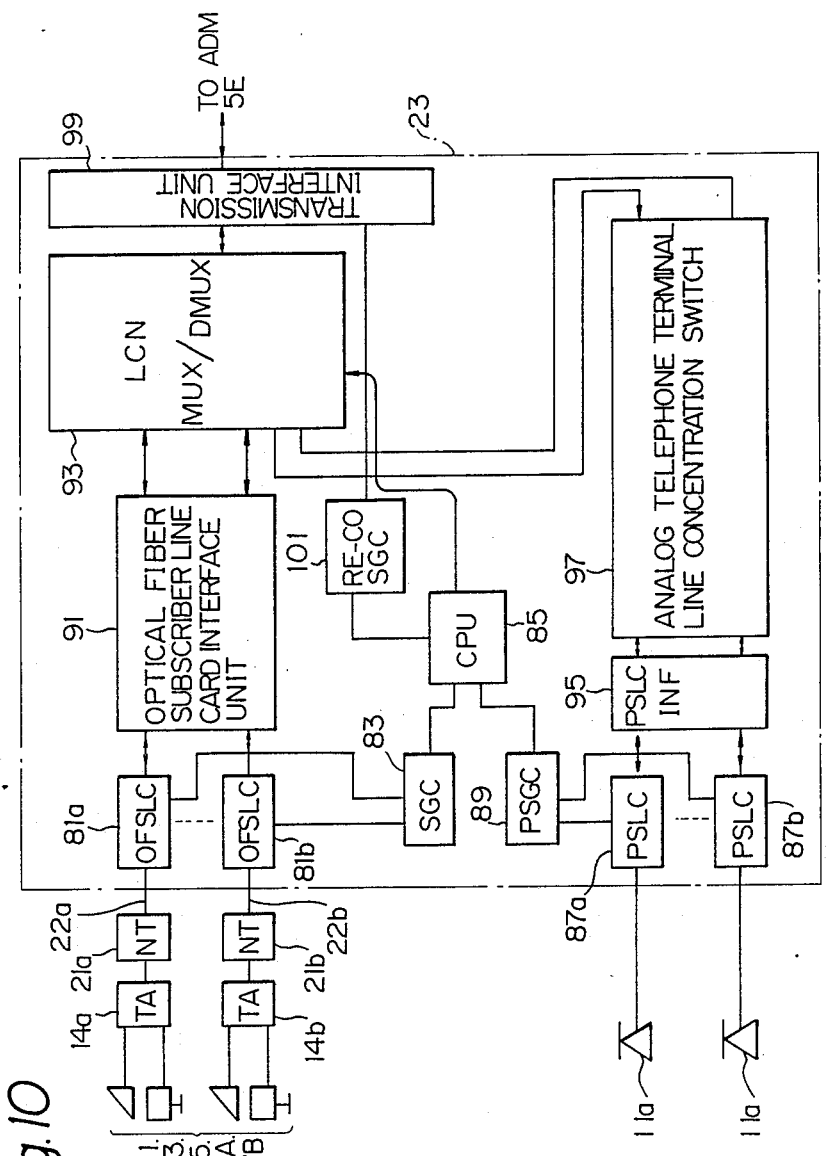
FIG. 10 is a diagram showing a broadband remote device included in the system shown in FIG. 4.

FIG. 10 is a block diagram showing the construction of the broadband remote device 23.

An example of a broadband communication transmission is explained in the following with respect to the broadband remote device 23 connected to the drop/insert multiplexing unit (ADM) 5E and shown in FIG. 10. In the broadband remote device 23, the narrowband calls from the analog telephone terminal 11, the special service terminal 13 and the narrowband ISDN terminal device 15, and the broadband calls from the broadband ISDN terminals 17A and 17B are line-concentrated and multiplexed and transmitted to the ADM 5E.

The line concentration and multiplexing are carried out as follows.

The narrowband calls from the analog telephone terminal 11, the special service terminal 13, and the narrowband ISDN terminal 15 are received by an optical fiber subscriber line card (OFSLC) 81a through a terminal adapter (TA) 14a, a network terminator (NT) 21a and an optical fiber cable 22a. Similarly, the broadband calls from the broadband ISDN terminal 17A and 17B are received by an optical fiber subscriber line card (OFSLC) 81b through a terminal adapter (TA) 14b, a network terminator (NT) 21b and an optical fiber cable 22b. The process of line concentration and multiplexing for these calls is carried out by a signal control unit (SGC) 83 and the processed results are transferred to a central processing unit (CPU) 85.

On the other hand, narrowband calls from other analog telephone terminals 11a and 11b which are not shown in FIG. 4 are respectively received by analog telephone terminal subscriber line cards (PSLC) 87a and 87b, and the process of line concentration and multiplexing for these calls is carried out by an analog telephone signal control unit (PSGC) 89 and the processed results are transferred to the central processing unit 85. The integrated control unit 85 controls the line concentration and the multiplexing on the narrow/broadband calls received by a line concentration and multiplexing-/separating unit 93 from the optical fiber subscriber line cards 81a and 81b through an optical fiber subscriber line card interface unit 91 and the narrowband calls received from the analog telephone terminal subscriber line card 87a and 87b through an analog telephone terminal subscriber line card interface unit (PSLC INF) 95 and an analog telephone terminal line concentration switch 97. For example, the line concentration/multiplexing is carried out in such a manner that, when the service attribute of the call control signal (see FIG. 7) received from the optical fiber subscriber line card 81 represents a narrowband call, the signal control unit 83 informs the central processing unit 85, whereby a control for line concentration and multiplexing of the call data with the channels allocated to a narrowband exchange, for example 8B, is generated in the line concentration multiplexing/separating unit 93. This relationship is the same for broadband calls received by the optical fiber subscriber line card 81 and for narrowband calls received by the analog telephone terminal subscriber line card 87.

The calls, which have been processed to be line collected and multiplexed as above by the line collecting and multiplexing/demultiplexing unit, are input through a transmission interface unit 99 to the control switch 60 in the ADM 5E; wherein the input narrowband calls are inserted into the channel determined in accordance with the destination of the input narrowband call in the channels CH2 and CH4 allocated as mentioned above and are transmitted to the output optical fiber cable 32, and the input broadband calls are inserted into the channel CH3 allocated as mentioned above and are transmitted to the output optical fiber cable 32.

The demultiplexing/line separating process for the calls in the broadband remote device 23, as well as the above-mentioned line concentration/multiplexing process, is not the gist of the present invention, and thus an explanation thereof is redundant with regard to the present invention. Therefore, a description is given only that the call control signal for the demultiplexing/line separating process is sent through the transmission interface unit 99 and the demultiplexing/line separating control signal transmitting unit (RE-CO SGC) 101 to the central control unit 85, so that the distributing process in the broadband remote device 23 for the corresponding calls to respective terminals is carried out, and a more detailed description is omitted. The sequence of establishing the communication control system is as follows.

One of the ADMs in the above-mentioned ring transmission system 1 is assumed to be used as a control ADM (hereinafter referred to as C-ADM), and the other ADMs are remote ADMs (hereinafter referred to as R-ADM). The following channel allocation change sequence is performed between the C-ADM and the R-ADMs. This, description is provided with reference to FIGS. 11 to 15. Although the channel allocation changing sequence is described, it also can be used for a channel setting.

Figure 11:
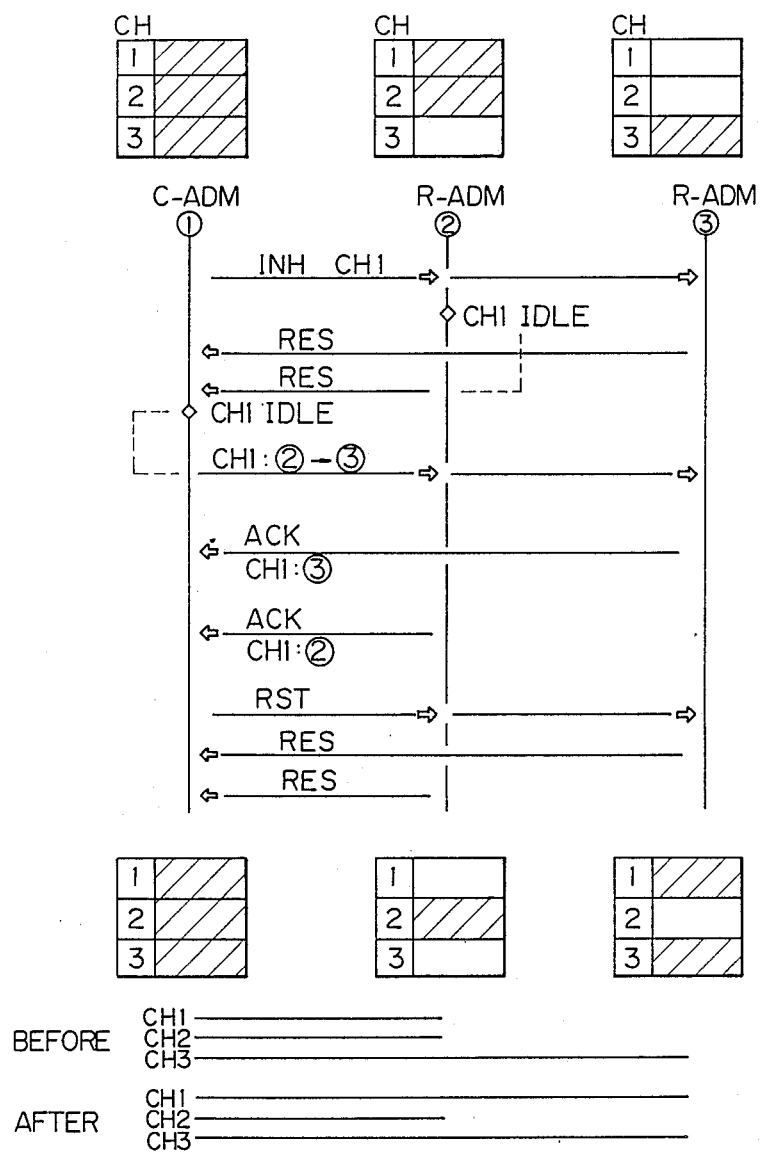
FIG. 11 is a diagram showing a processing flow among three ADMs for channel allocation change, according to the first embodiment of the present invention.

FIG. 11 is a diagram generally explaining an example of the changing of the channel allocation. In FIG. 11, a C-ADM ① and two R-ADMs ② and ③ are considered. Initially, channels CH1 to CH3 are allocated to the C-ADM ① so that these channels are available for the C-ADM ①; the channels CH1 and CH2 are allocated for the R-ADM ② so that these channels are available for the R-ADM ②; and the channel CH3 is allocated to the R-ADM ③ only the channel CH3 is available for the R-ADM ③ as illustrated in the upper portion of the figure. By the following change of the channel allocation, the allocation of the channel CH1 to the R-ADM ② is changed to the allocation to the R-ADM ③ as illustrated in the lower portion of the figure. To perform the change of the allocation, the C-ADM ① sends a channel inhibit command INH CH1 for inhibiting the use of the channel CH1 to all of the R-ADMs. In response to the channel inhibit command INH CH1, the R-ADMs ② and ③ inhibit the use of the channel CH1 after receiving the channel inhibit command. The R-ADM ② generates a response RES to the command after the communication using the CH1 is finished if the communication was begun before receiving the command. The R-ADM ③ immediately generates a response RES when it receive command because the channel CH1 is not allocated to the R-ADM ③ at that time. After the C-ADM ① recognizes that the channel CH1 is idle on the ring transmission line 3, the C-ADM ① generates a channel allocation change CH1: ② → ③. In response to the command CH1: ② → ③, the R-ADMs ② and ③ respectively sends acknowledge messages ACK to the C-ADM ①. Then, the C-ADM ① sends a channel inhibit reset command RST to the R-ADMs ② and ③. In response to the command RST, the R-ADMs ② and ③ send inhibit reset response message to the C-ADM ①. As a result, the channel allocation of the channel CH1 is changed from the R-ADM ② to the R-ADM ③, as illustrated in the lower portion of the figure.

Figure 12B:
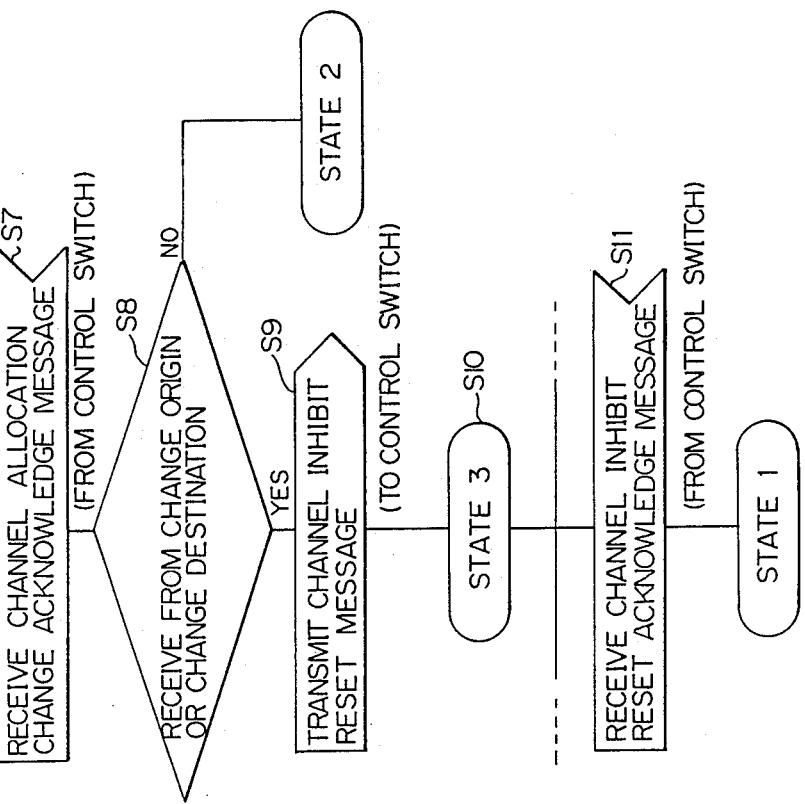

FIG. 12 is a flowchart explaining in more detail the process flow in the C-ADM for channel allocation change. Referring to FIGS. 8 and 12, when the control CPU 50 in the C-ADM receives a channel allocation change requirement (S1 in FIG. 12), it sends a channel inhibit message to the control switch 60 in the C-ADM (S2 in FIG. 12). The control switch 60, which receives the message, inserts the channel inhibit message into a time slot Z1 in the overhead OH of communication channel (see FIG. 6) constructed on and transmitted through the output optical fiber cable 32, and sends it to the optical fiber cable 32 (S1 and S2 in FIG. 13).

Figure 14:
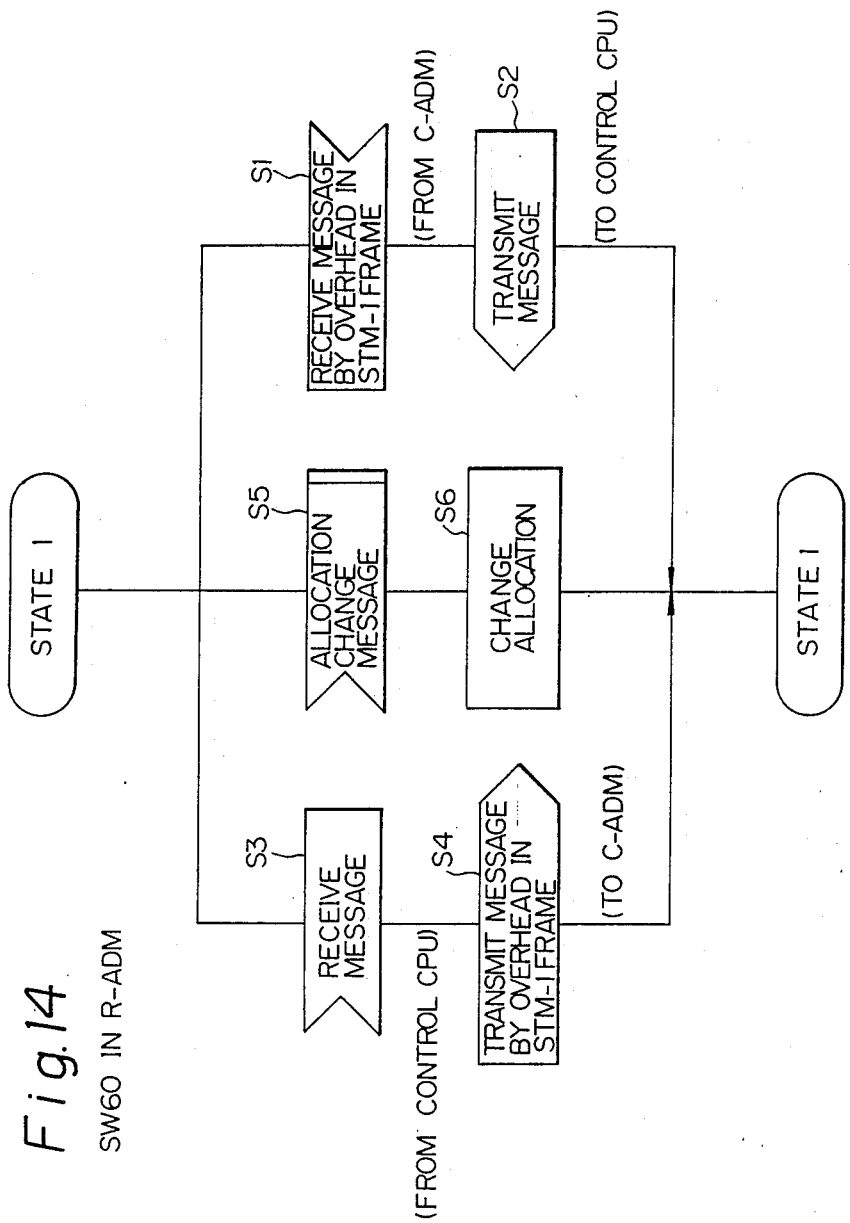
FIG. 14 is a diagram showing a processing flow in a control switch in a R-ADM for channel allocation change, according to the first, embodiment of the present invention.

The control switch 60 in a R-ADM, which sequentially receives the channel inhibit messages transmitted through the optical fiber cable 32, extracts a message directed to that R-ADM (S1 in FIG. 14) and transfers it to the control CPU 50 in that R-ADM (S2 in FIG. 14). The control CPU 50 in the R-ADM, which received the message, performs inhibit processing for the specified channel (S2 and S3 in FIG. 15), and sends a channel inhibit acknowledge message in response to the received channel inhibit message to the control switch 60 in that R-ADM (S4 in FIG. 15 and S3 in FIG. 14), and enters channel allocation change message receive waiting state (S6 in FIG. 15). The control switch 60, which received the channel inhibit acknolwedge message, inserts it into a time slot of the communication channel between the ADMs, and sends it in the same way as for the transmission of the above-mentioned channel inhibit message to the output optical fiber cable 32 (S4 in FIG. 13).

The channel inhibit acknowledge message transmitted through the optical fiber cable 32 to the C-ADM is extracted by the control switch 60 in the C-ADM in the same way as above (S3 in FIG. 13), and is transferred from there to the control CPU 50 in the C-ADM (S4 in FIG. 13). The control CPU 50, which received the channel inhibit acknowledge message (S3 in FIG. 12) waits for the channel inhibit acknowledge message if it has not yet received the messages from both R-ADMs of the set origin and the set destination (NO in S4 in FIG. 12), and transfers a channel allocation change message to the control switch 60 in the C-ADM when it receives the messages form both R-ADMs (S5 in FIG. 12), and waits for a channel allocation change response message from the R-ADM (S6 in FIG. 12).

The control switch 60 in each R-ADM, which receives the channel allocation change message through its input optical fiber cables 34, extracts the message directed to that R-ADM (S1 in FIG. 14) and transfers it to the control CPU 50 in that R-ADM (S2 in FIG. 14 and S7 in FIG. 15). The control CPU 50, which receives the channel allocation change message, transfers the allocation change message to the control switch 50 in that R-ADM (S8 in FIG. 15 and S5 in FIG. 14), to generate the allocation of the control switch, i.e., the allocation of the channel to be used for the narrowband call and/or the broadband call (S6 in FIG. 14).

After the allocation process at the control switch 60, the control CPU 50 in the said R-ADM transfers a channel allocation change acknowledge message to the control switch 60 in the said R-ADM (S9 in FIG. 15, and S3 in FIG. 14). The control switch 60 inserts and transmits it through a time slot in the overhead of the communication channel between the ADMs, in the same way as the transmission of the channel inhibit acknowledge message to the output optical fiber cable (S4 in FIG. 14).

When the channel allocation change acknowledge message is received by the C-ADM, which is waiting for the channel allocation change acknowledge message, through an optical fiber cable 34, the message is extracted by the control switch 60 (S3 in FIG. 13), and is transferred from there to the control CPU 50 in the C-ADM (S4 in FIG. 13, S7 in FIG. 12). After the change of the allocation, if no message is received from either the change destination or change origin of the R-ADMs, it waits for the channel allocation change acknowledge message. If the message is received from both R-ADMs (YES in S8 in FIG. 12), a channel inhibit reset message is transferred to the control switch 60 in the C-ADM (S9 in FIG. 12), which then waits for a channel inhibit reset acknowledge message (S10 in FIG. 12).

The control switch 60, which receives the channel inhibit reset message, inserts and transmits the message to the time slot in the overhead of the communication channel between the ADMs (S2 in FIG. 13).

The control switch 60 in each R-ADM, which receives the channel inhibit reset message through the input optical fiber cable 34, extracts the message designated for that R-ADM (S1 in FIG. 14) and transfers it to the control CPU 50 in that R-ADM (S2 in FIG. 14 and S11 in FIG. 15). In response to the channel inhibit reset message, the control CPU 50 performs the channel inhibit reset process of the communication channel which has been set to an inhibit state (S12 in FIG. 15). Then, the channel inhibit reset acknowledge message is transferred to the control switch 50 in that R-ADM (S13 in FIG. 15) so that the channel allocation change process in the control CPU 50 in that R-ADM is returned to the initial state. The control switch 50, which receives the channel inhibit reset response message, inserts and transmits it to the time slot of the communication channel in the same way as above (S4 in FIG. 14), and the channel allocation change process in the control switch is returned to the initial state.

The control switch 50 in the C-ADM, which receives the channel inhibit reset acknowledge message through the input optical fiber cable, extracts the message (S3 in FIG. 13) and transfers it to the control CPU 50 in the C-ADM (S4 in FIG. 13 and S11 in FIG. 12). The control CPU 50 in the C-ADM, which receives the channel inhibit reset acknowledge message, returns to the initial state for the channel allocation change process.

Therefore, when the channel allocation change process is finished, the allocation of the channel to the specified ADM is changed from the initial state, for example, from a predetermined channel allocated state to the channel allocated state as shown in FIG. 9, so that a communication control system determined by the above-described channel allocation is established between the respective ADMs on the ring transmission line 3.

Note that the sequence shown in FIGS. 11 to 15 can also be used for an initial allocation of the channels in the same way as the allocation change mentioned above or for the other setting process sequence, or for an allocation change accompanied by a change of traffic. In either case of the initial allocation or the allocation change, in the processing flow, the origin of the change and the destination of the change in the steps S4 and S8 respectively correspond to the channel allocation reset R-ADM and the channel allocation R-ADM specified by the C-ADM. For example, when a channel CH1 which has been used by the R-ADM 5B, is allocated for use by the R-ADM 5D, the R-ADM 5B is the origin of the change and the R-ADM 5D is the destination of the change.

Figure 16:
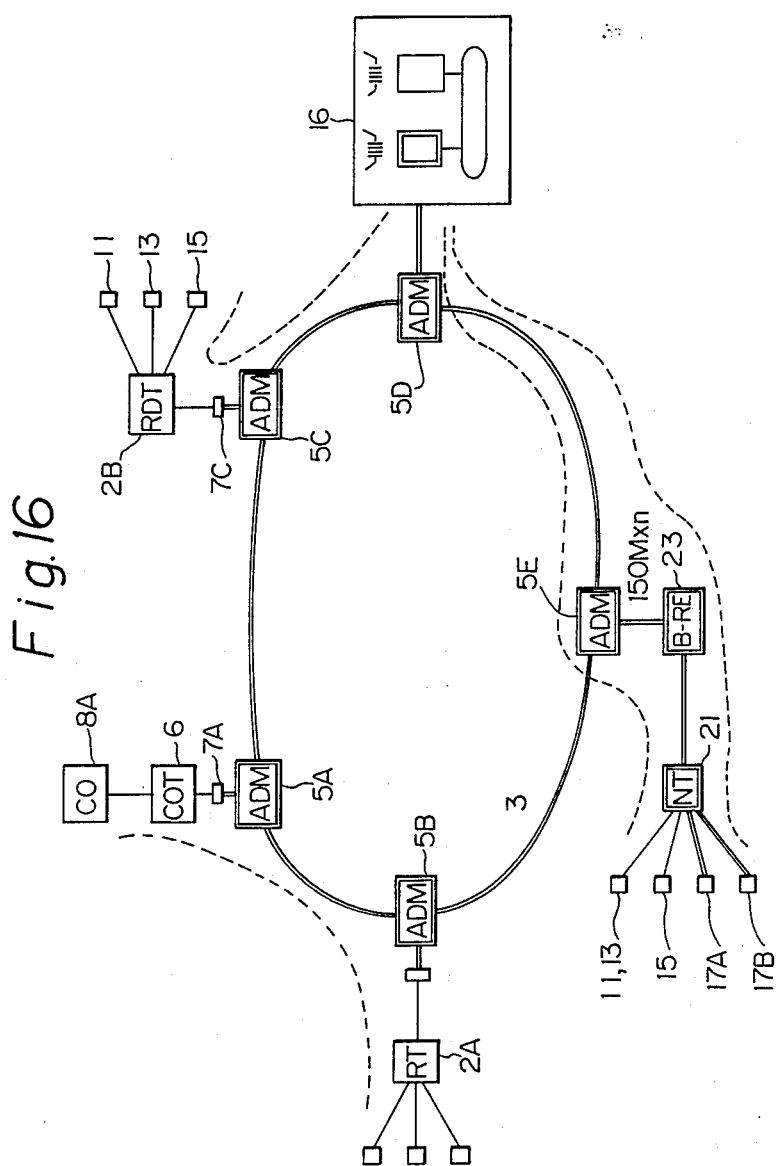
FIG. 16 is a diagram showing a ring transmission system according to a second embodiment of the present invention.

FIG. 16 shows a ring transmission system according to a second embodiment of the present invention. In this embodiment, a narrow/broadband exchange 16 is connected to the ADM 5D in the ring transmission system of the above-described first embodiment, and a narrowband/broadband ISDN network system is formed between the narrow/broadband exchange 16 and the analog telephone terminal 11, the special service terminal 13, the narrowband ISDN terminal 15 and the broadband/ISDN terminals 17A and 17B, to represent an all-round communication network in which the network configuration of the above-described first embodiment is further advanced. By utilizing the sequence for establishing the independent networks in the communication control system in the above-described example of the first embodiment, it is possible to gradually integrate the ring transmission system of the first embodiment with the ring transmission system of the second embodiment. Namely, first the narrowband exchange 8B and the broad band exchange 9 are integrated to form a narrow/broadband exchange 16. Where only the exchanges are to be integrated, it is not necessary to change the allocation of the channel in the ADM 5D. Next, in the ADM 5A, the channel CH4, which has been used as a channel for transmitting and receiving signals between the ring transmission line 3 and the narrowband exchange 8A, is reset (only the channel CH5 is allocated to the ADM 5A), and a new channel CH4 is allocated to the ADM 5D for transmitting and receiving signals between the ring transmission line 3 and the narrow/broadband exchange 16 (the channels CH1, CH2, CH3, and CH4 are allocated to the ADM 5E). Accordingly, the channel CH4, which has been used for transmitting and receiving signals between the narrowband exchange 8A and the broadband remote device 23 in the ring transmission system 3 of the first embodiment, can be exchanged to one for transmitting and receiving signals between the narrow/broadband exchange 16 and the broadband remote device 23.

Therefore, the network construction can be gradually integrated by only changing the allocation of the channels on the ring transmission line 3, while the ring transmission line 3 remains unchanged.

In the above example of the transfer from the first embodiment to the second embodiment, only an example of the change of the channel allocation is given, but it is of course possible to change the construction of the network by the same sequence, accompanied by additions or deletions of devices connected to the ring transmission line 3 and the ADMs.

The narrow/broadband exchange 16, which is formed as described above and is connected to the ADM 5D on the ring 1, does not constitute the gist of the present invention, as apparent form the above description, and a summary thereof is given as follows.

As shown in FIG. 17, the narrow/broadband exchange 16 consists of a broadband subsystem 70, a subsystem 80 for narrowband calls controlled and connected by the broadband subsystem 70, and a control system 90 connected to both subsystems 70 and 80, for controlling the integration of the narrow/broadband calls. The broadband subsystem 70 consists of a multiplexing/demultiplexing unit 71 connected to the drop-/insert pass control switch 65 in the above-described ADM 5D, a broadband packet (or ATM) switching module (PSW) 72 connected to the multiplexing-/demultiplexing unit 71, a broadband line switching module (BSW) 73, and a broadband call processor (BPR) 74 for controlling the switching modules 72 and 73. The subsystem 80 for the narrowband calls consists of a digital switching module (DSM) 81, a call processor (CPR) 86 for narrowband calls for switching the control of a No. 7 common channel signal subsystem 82 connected to the digital switching module 81, a packet subsystem 83, a data call subsystem 84, a terminal 85, and the digital switching module 81. The control system 90 consists of a multiprocessor ring bus 91 to which the No. 7 common channel signal subsystem 82, the packet subsystem 83, the data call subsystem 84, the call processor 86 and the broadband call processor 74 are connected, a main processor (MPR) 92 connected to the multiprocessor ring bus 91, and a data base processor (DBP) 93. The broadband packet switching module 72, the broadband circuit switching module 73, the packet subsystem 83, and the data call subsystem 84 are connected to a corresponding trunk installed in a not-shown exchange.

The exchange of user information in this construction is briefly described as follows. A control signal for a broadband packet call or a broadband circuit call received from an other office through the above-mentioned trunk is transferred through the broadband packet switching module 72 or the broadband circuit switching module 73, and through the broadband call processor 74 and the multiprocessor ring bus 91, to the main processor 92. The broadband call data, which is transmitted to the broadband packet switching module 72, the broadband circuit switching module 73, and the multiplexing/demultiplexing unit 71 which are switched in response to the switching information for the broadband call, which is returned and transmitted from the main processor 92 to the broadband call processor 74, is input to the above-mentioned ADM 5D. The broadband call data is output from the broadband packet switching module 72 or the broadband circuit switching module 73 in such a way that it is multiplexed with the channel for the broadband call allocated by the above-mentioned switching control to the ADM 5D, and is multiplexed with the other calls in the multiplexing/demultiplexing unit 71. The broadband call data thus input to the ADM 5D is inserted therein into the channel already allocated as mentioned above and is transmitted through the output optical fiber cable 34 to its destination. The exchange process with respect to the broadband calls is the same for the narrowband calls. Namely, the exchange control system, constructed by replacing the above-mentioned broadband packet switching module 72 or the broadband line switching module 73 with the digital switching module 81, replacing the inputs to the modules 72 and 73 with the inputs to the No. 7 common-channel signal subsystem 82, to the packet subsystem 83, to the data call subsystem 84, to the data call subsystem 84, and to the analog telephone 87 from the other office, and by replacing the broadband call processor 74 with the call processor 86, constitutes a call multiplexing system for the narrowband calls on the ring transmission line 3. Also, the system for demultiplexing a call from the ring transmission line 3 is formed by a system in which call control information sent to the multiprocessor ring bus 91 through the multiplexing/demultiplexing unit 71, the broadband packet switching module 72 for the broadband line switching module 73, the broadband call processor 74 or the digital switching module 81 and the call processor 86, is input to the main processor 92, and by switching information transferred therefrom to the broadband call processor 74 or the call processor 86, the switching in the broadband packet switching module 72 or the broad line switching module 73, or the digital switching module is effected.

As described above, according to the present invention, various communication systems (networks) can be efficiently developed as an all-round communication network by a gradual incorporation and integration thereof, while maintaining the current equipment in the communication systems. Also, the present invention can cope with any later changes to the communication system.

What is claimed is:

1. A ring transmission system comprising:
    a ring transmission line, having a plurality of communication channels, for transmitting data through the plurality of communication channels; and
    a plurality of nodes connected to said ring transmission line, the communication channels being allocated for use by said nodes, each of said nodes includes
        drop/insert means for one of dropping data from said ring transmission line and inserting data into said ring transmission line, by utilizing one of the one or more communication channels allocated to one of said nodes corresponding thereto; and
        allocation changing means for changing the allocation of the one or more communication channels allocated to the one of said nodes corresponding thereto;
    wherein, between said nodes having the same communication channel allocated thereto, an independent exchange network is constructed so that a plurality of independent exchange networks are constructed by said plurality of nodes and said ring transmission line, and the construction of the independent exchange networks being variable by changing the allocation of the communication channels through the control signaling between nodes.

2. A ring transmission system according to claim 1, wherein the plurality of independent exchange networks are those for respectively performing broadband network communications and narrowband network communications independently.

3. A ring transmission system according to claim 1,
    wherein each of the communication channels has the same transmission capacity for transferring data through said ring transmission line so that a transmission speed of each of the communication channels is the same and fixed, and
    wherein each of the communication channels being comprised of a plurality of subblocks.

4. A ring transmission system according to claim 1, wherein a transmission speed of each of the communication channels is determined to be a maximum communication speed of the plurality of independent exchange networks.

5. A ring transmission system according to claim 2, wherein a transmission speed of each of the communication channels is determined to be the transmission speed of the broadband network communications, and each of the narrowband network communications is carried out by utilizing divided communication channels.

6. A ring transmission system according to claim 1, wherein when channel allocation is to be changed in any of said nodes by said allocation changing means, the communication channel allocated to said node is inhibited for use and then, after changing the allocation of the communication channel of the node the communication channel is opened for use.

7. A ring transmission system according to claim 1, wherein each of said nodes further comprises a table for registering channel information indicating the communication channels available for said node corresponding thereto, said communication being effected by use of the communication channels having the channel information registered in said table.

8. A ring transmission system according to claim 1, wherein said nodes are connected through said ring transmission line, each node forming an add-drop-multiplex unit (ADM), and wherein one or more of said nodes are connected to synchronous transfer mode (STM) units, each having an allocated number of variable length slots included in the communication channel allocated thereto which are used to communicate, and the other nodes are connected to asynchronous transfer mode units, each having an allocated number of fixed or variable length cells included in the communication channel allocated thereto which are used to communicate.

9. A ring transmission system according to claim 1, wherein each of said nodes further comprises control means for controlling the connection between said ring transmission line and a terminal device, said control means including said drop/insert means for dropping or inserting a communication channel from or into said ring transmission line, by multiplexing data from respective terminal devices and inserting it into an allocated communication channel on said ring transmission line, or by dropping, form the allocated communication channel on said ring transmission line, multiplexed data transmitted from another node through said ring transmission line, whereby communication between the nodes in an exchange network utilizing the allocated communication channel is effected.

10. A ring transmission system according to claim 1, wherein one of said nodes is a control node having allocation means to allocate the communication channels to said nodes.

11. A ring transmission system according to claim 10, wherein said control node has means for determining the allocation of the plurality of communication channels to said nodes other than the control node, wherein when a communication channel is to be allocated to a predetermined node of said nodes, an inhibit command to inhibit the use of the communication channel is transmitted from said control node to at least said nodes having the communication channel allocated thereto, wherein after receiving an acknowledge message from said predetermined node, a channel allocation changing command is transmitted from said control node to said predetermined node, and wherein after receiving an acknowledge message from said predetermined node in response to the channel allocation changing command, an open command to allow use of the communication channel is transmitted to said nodes receiving the inhibit command.

12. A ring transmission system according to claim 11, wherein when a predetermined communication channel is to be allocated to a plurality of said nodes, said control node transmits the channel allocation changing command to all of the plurality of said nodes after receiving acknowledge messages from all of the plurality of said nodes in response to the inhibit command.

13. A ring transmission system according to claim 11, wherein said control node has means for storing channel information indicating the communication channels being used in respective nodes, and wherein each of said respective nodes has means for storing channel information indicating communication channels available to the own node, whereby a communication channel transmitted through said ring transmission line and allocated to said nodes other than the own node is bypassed by said node.

14. A ring transmission system according to claim 1, wherein said ring transmission line is a synchronous high-speed transmission line, wherein a said nodes connected to said transmission line include one control node and a plurality of remote nodes, wherein control node for supervising and controlling an operating state of said ring transmission line including state of sue of the communication channels, and for, if necessary, commanding a change in the communication channel being used in said remote nodes by producing a channel allocation change command, and wherein said remote nodes having means to change the allocation of the communication channel in accordance with the channel allocation change command from said control node, and means to return a change acknowledge message to said control node.

15. A ring transmission system according to claim 14, wherein the communication channel comprises an overhead part and a payload for transferring user data, and wherein the channel allocation change command/change acknowledge message being transmitted by use of predetermined bytes of the overhead part.

16. A ring transmission system for forming a plurality of independent exchange networks, said ring transmission system comprising:

ring transmission means, having a plurality of communication channels, for transmitting data through the communication channels; and a plurality of nodes, operatively interconnected by said ring transmission means, for allocating at least one of the communication channels to each of the nodes, each of said nodes includes channel allocation means for changing the allocation of the at least one of the communication channels allocated to each node; and drop/insert demultiplexing/multiplexing means for controlling dropping and demultiplexing data from the communication channel allocated thereto or inserting and multiplexing data into the communication channel allocated thereto, wherein the plurality of independent exchange networks are varied by changing the allocation of the communication channels allocated to said nodes.

17. A ring transmission system according to claim 16, wherein the plurality of independent exchange networks are those for respectively performing broadband network communications and narrowband network communications independently.

18. A ring transmission system according to claim 17,
wherein each of the communication channels has the same transmission capacity for transferring data through said ring transmission line so that a transmission speed of each of the communication channels is the same and fixed, and wherein each of the communication channels is comprised of a plurality of subblocks.

19. A ring transmission system according to claim 18, wherein each o said nodes further comprises a table for registering channel information indicating the communication channels available for said node corresponding thereto, said communication being effected by use of the communication channels having the channel information registered in said table.

20. A ring transmission system according to claim 19,
wherein said ring transmission line is a synchronous high-speed transmission line,
wherein said nodes connected to said transmission line include one control node and a plurality of remote nodes,
wherein a control node for supervising and controlling an operating state of said ring transmission line including state of use of the communication channels, and for, if necessary, commanding a change in the communication channel being used in said remote nodes by producing a channel allocation change command, and
wherein said remote nodes having means to change the allocation of the communication channel in accordance with the channel allocation change command form said control node, and means to return a change acknowledge message to said control node.

21. A ring transmission system comprising:
a ring transmission line, having a plurality of communication channels, for transmitting data through the plurality of communication channels; and
a plurality of nodes connected to said ring transmission line, the communication channels being allocated for use by said nodes, each of said nodes includes drop/insert means for one of dropping data from said ring transmission line and inserting data into said ring transmission line, by utilizing one of the one or more communication channels allocated to one of said nodes corresponding thereto; and,
allocation changing means for changing the allocation of the one or more communication channels allocated to the one of said nodes corresponding thereto;
wherein said nodes are connected through said ring transmission line, each node forming an add-drop-multiplex unit,
wherein one or more of said nodes are connected to synchronous transfer mode units, each having an allocated number of variable length slots included in the communication channel allocated thereto which are used to communicate, and the other nodes are connected to asynchronous transfer mode units, each having an allocated number of fixed or variable length cells included in the communication channel allocated thereto which are used to communicate, and
wherein, between said nodes having the same communication channel allocated thereto, an independent exchange network is constructed so that a plurality of independent exchange networks are constructed by said plurality of nodes and said ring transmission line.

* * * * *

UNITED STATES PATENT AND TRADEMARK OFFICE
CERTIFICATE OF CORRECTION

PATENT NO. : 4,965,790
DATED : OCTOBER 23, 1990
INVENTOR(S) : TETSUO NISHINO ET AL.

It is certified that error appears in the above-identified patent and that said Letters Patent is hereby corrected as shown below:

ON TITLE PAGE:   [57] ABSTRACT, line 7, "whereby," should be --whereby--.

*Col. 6, line 19, after "must" insert --be--.

*Col. 18, line 6, delete "a".

Signed and Sealed this

Twelfth Day of May, 1992

Attest:

DOUGLAS B. COMER

*Attesting Officer*         *Acting Commissioner of Patents and Trademarks*